United States Patent
Huh (10) Patent No.: US 11,932,223 B2
(45) Date of Patent: Mar. 19, 2024

(54) REGENERATIVE BRAKING CONTROL DEVICE FOR ELECTRONIC FOUR-WHEEL DRIVE VEHICLE

(71) Applicants: Hyundai Motor Company, Seoul (KR); Kia Motors Corporation, Seoul (KR)

(72) Inventor: Jee Wook Huh, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 688 days.

(21) Appl. No.: 17/107,328

(22) Filed: Nov. 30, 2020

(65) Prior Publication Data

US 2022/0001748 A1  Jan. 6, 2022

(30) Foreign Application Priority Data

Jul. 6, 2020  (KR) .................. 10-2020-0082629

(51) Int. Cl.
| | | |
|---|---|---|
| *B60T 8/172* | (2006.01) | |
| *B60L 3/10* | (2006.01) | |
| *B60L 3/12* | (2006.01) | |
| *B60L 7/18* | (2006.01) | |
| *B60T 8/26* | (2006.01) | |
| *B60T 8/28* | (2006.01) | |
| *B60T 8/32* | (2006.01) | |
| *B60W 30/18* | (2012.01) | |

(52) U.S. Cl.
CPC .............. *B60T 8/172* (2013.01); *B60L 3/104* (2013.01); *B60L 3/12* (2013.01); *B60L 7/18* (2013.01); *B60T 8/26* (2013.01); *B60T 8/28* (2013.01); *B60T 8/32* (2013.01); *B60W 30/18127* (2013.01); *B60L 2220/42* (2013.01); *B60L 2240/461* (2013.01); *B60L 2240/465* (2013.01); *B60L 2260/28* (2013.01); *B60T 2270/60* (2013.01)

(58) Field of Classification Search
CPC ... B60T 8/172; B60T 8/26; B60T 8/28; B60T 8/32; B60T 2270/60; B60L 3/104; B60L 3/12; B60L 7/18; B60L 2220/42; B60L 2240/461; B60L 2240/465; B60L 2260/28; B60W 30/18127
See application file for complete search history.

(56) References Cited

U.S. PATENT DOCUMENTS

| | | | | |
|---|---|---|---|---|
| 5,988,307 A | * | 11/1999 | Yamada | B60K 17/356 903/906 |
| 7,517,298 B2 | * | 4/2009 | Ortmann | B60K 6/44 477/3 |
| 7,575,287 B2 | * | 8/2009 | Matsuura | B60W 30/18127 701/70 |
| 11,479,231 B2 | * | 10/2022 | Huh | B60K 6/448 |
| 11,654,882 B2 | * | 5/2023 | Huh | B60K 6/52 477/109 |
| 2002/0007974 A1 | * | 1/2002 | Nagano | B60K 6/52 180/243 |

(Continued)

*Primary Examiner* — Dale W Hilgendorf
(74) *Attorney, Agent, or Firm* — MORGAN, LEWIS & BOCKIUS LLP (57) ABSTRACT

A regenerative braking control device for an electronic four-wheel drive vehicle, may improve fuel efficiency through a regenerative braking control optimized for the electronic four-wheel drive vehicle.

18 Claims, 5 Drawing Sheets

(56) References Cited

U.S. PATENT DOCUMENTS

| | | | | |
|---|---|---|---|---|
| 2002/0180266 | A1* | 12/2002 | Hara | B60W 30/18109 |
| | | | | 903/918 |
| 2003/0042054 | A1* | 3/2003 | Matsubara | B60K 6/448 |
| | | | | 180/65.6 |
| 2007/0241611 | A1* | 10/2007 | Shimada | B60K 6/44 |
| | | | | 303/155 |
| 2015/0344021 | A1* | 12/2015 | Kim | B60W 30/18072 |
| | | | | 180/65.265 |
| 2016/0031429 | A1* | 2/2016 | Yukawa | B60L 50/00 |
| | | | | 903/930 |
| 2016/0046280 | A1* | 2/2016 | Lee | B60W 10/02 |
| | | | | 701/22 |
| 2016/0059705 | A1* | 3/2016 | Kim | B60T 8/1701 |
| | | | | 701/22 |
| 2016/0129810 | A1* | 5/2016 | Takahashi | B60L 7/18 |
| | | | | 903/903 |
| 2016/0347171 | A1* | 12/2016 | Ogawa | B60W 10/08 |
| 2019/0263385 | A1* | 8/2019 | Zhou | B60K 6/52 |
| 2021/0316712 | A1* | 10/2021 | Huh | B60K 6/52 |
| 2022/0185261 | A1* | 6/2022 | Huh | B60W 10/11 |

* cited by examiner

REGENERATIVE BRAKING CONTROL DEVICE FOR ELECTRONIC FOUR-WHEEL DRIVE VEHICLE

CROSS-REFERENCE TO RELATED APPLICATION

The present application claims priority to Korean Patent Application No. 10-2020-0082629 filed on Jul. 6, 2020, the entire contents of which is incorporated herein for all purposes by this reference.

BACKGROUND OF THE INVENTION

Field of the Invention

The present invention relates to a regenerative braking control device for an electronic-four wheel drive vehicle, and more particularly, to a regenerative braking control device for an electronic four-wheel drive vehicle for optimizing the regenerative braking to improve fuel efficiency.

Description of Related Art

As is well known, a hybrid vehicle, an electric vehicle, a hydrogen fuel cell vehicle, and the like are provided with an electric motor as a traveling driving source, and such a vehicle is referred to as an electronic vehicle.

As an example of a four-wheel drive power train of the electronic vehicle, a power train having an engine and a front wheel motor connected to a front wheel and a rear wheel motor with a smaller size than that of the front wheel motor connected to a rear wheel may be applied.

In the case of the four-wheel drive power train having the engine and the front-wheel motor, which are main driving sources for vehicle traveling, connected to the front wheel and the rear-wheel motor, which is a secondary driving source, connected to the rear wheel, an optimized regenerative braking control technology for securing fuel efficiency has not yet been established, and a regenerative braking control is performed in the same method as a two-wheel drive power train, which becomes a factor of degrading fuel efficiency.

Since the regenerative braking control technology is the technology which occupies the largest portion in securing fuel efficiency of the electronic vehicle, there is a demand for a regenerative braking control technology differentiated from the electronic two-wheel drive vehicle and optimized for the electronic four-wheel drive vehicle to maximize the improvement in fuel efficiency of the electronic four-wheel drive vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a regenerative braking control device configured for an electronic four-wheel drive vehicle, which may improve fuel efficiency through a regenerative braking control optimized for an electronic four-wheel drive vehicle.

Various aspects Accordingly, various aspects of the present invention provide a regenerative braking control device configured for an electronic four-wheel drive vehicle including: a front wheel power train including an engine, a front wheel motor, an engine clutch mounted between the engine and the front wheel motor, a hybrid starter generator (HSG) connected to the engine to start the engine, and a transmission of shifting power of the engine and the front wheel motor to output the shifted power to a front wheel of the vehicle; a rear wheel power train including a rear wheel motor, and a reducer of reducing power of the rear wheel motor to output the reduced power to a rear wheel of the vehicle; a battery connected to the front wheel motor, the rear wheel motor, and the hybrid starter generator to be chargeable and dischargeable; and a control unit connected to the front wheel power train and the rear wheel power train and configured of distributing a rear wheel regenerative braking required amount to the rear wheel motor while braking is started, and distributing a front wheel regenerative braking required amount to the front wheel motor upon determining that a slip of the rear wheel will occur according to a speed difference between the front wheel and the rear wheel.

According to various exemplary embodiments of the present invention, the regenerative braking control device has specific features as follows.

The control unit is configured to distribute the front wheel regenerative braking required amount to the front wheel motor when the maximum power of the rear wheel motor is smaller than a regenerative braking allowable amount determined based on a driver required braking amount, upon determining that the slip of the rear wheel won't occur based on the speed difference between the front wheel and the rear wheel.

The control unit determines the front wheel regenerative braking required amount based on the speed difference between the front wheel and the rear wheel, upon determining that the slip of the rear wheel will occur. The control unit determines that the slip of the rear wheel won't occur when the speed difference between the front wheel and the rear wheel is smaller than a predetermined first reference value ($\alpha$), and determines that the slip of the rear wheel will occur when the speed difference between the front wheel and the rear wheel is equal to or greater than the first reference value, and thus performs a front wheel regenerative braking control.

Furthermore, the control unit is configured to reduce the rear wheel regenerative braking required amount distributed to the rear wheel motor by the front wheel regenerative braking required amount distributed to the front wheel motor, upon determining that the slip of the rear wheel will occur.

Furthermore, the control unit is configured to maintain the front wheel regenerative braking required amount and determines a value obtained by subtracting the front wheel regenerative braking required amount from the regenerative braking allowable amount as the rear wheel regenerative braking required amount, when distributing the front wheel regenerative braking required amount to the front wheel motor and then determining that the slip of the rear wheel is released based on the speed difference between the front wheel and the rear wheel. The control unit determines that the slip of the rear wheel is released when the speed difference between the front wheel and the rear wheel becomes a second reference value ($\beta$) or less determined as a value smaller than the first reference value ($\alpha$).

Furthermore, the control unit determines a value obtained by subtracting the rear wheel regenerative braking required amount from the regenerative braking allowable amount as the front wheel regenerative braking required amount, upon determining that the slip of the rear wheel won't occur according to a speed difference between the front wheel and the rear wheel.

Furthermore, the control unit is configured to distribute a Hybrid Starter Generator (HSG) regenerative braking required amount to the hybrid starter generator when the regenerative braking allowable amount is greater than the sum of the rear wheel regenerative braking execution amount and the front wheel regenerative braking execution amount, upon determining that the slip of the rear wheel won't occur. At the instant time, a value obtained by subtracting the front wheel regenerative braking execution amount, the rear wheel regenerative braking execution amount, and an engine friction amount from the regenerative braking allowable amount is determined as the HSG regenerative braking required amount.

The control unit performs a Hybrid Starter Generator (HSG) regenerative braking control using the hybrid starter generator in a state of locking-up the engine clutch and stopping an engine fuel supply.

According to the above configuration, the present invention may perform the front wheel regenerative braking to release the slip if the rear wheel regenerative braking with good efficiency is preferentially performed when the braking of the vehicle is started and there is a concern on the slip occurrence as the rear wheel regenerative braking is preferentially performed, securing braking stability and at the same time, improving fuel efficiency.

Furthermore, the present invention may further perform the HSG regenerative braking in addition to the front wheel regenerative braking if the regenerative braking allowable amount is dissatisfied when the rear wheel regenerative braking is first performed, maximally securing an effect of improving fuel efficiency by the regenerative braking.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described with reference to the accompanying drawings. The items expressed in the accompanying drawings may be different from forms actually implemented as schematic drawings for easily describing exemplary embodiments of the present invention.

Figure 1:
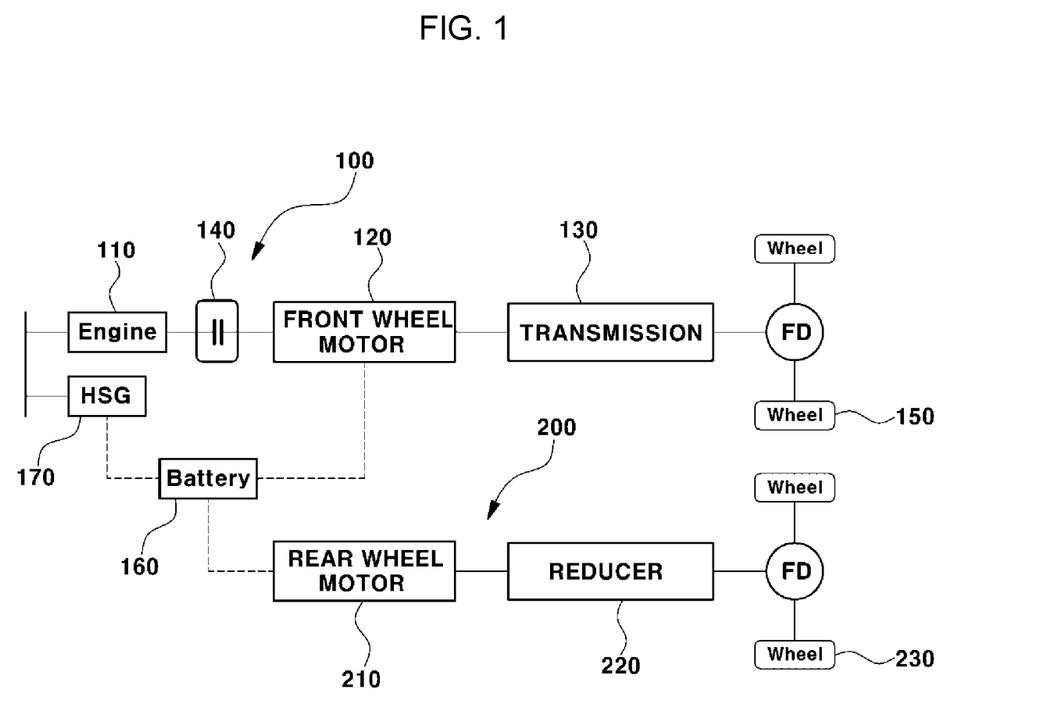
FIG. 1 is a diagram illustrating a power transfer system of an electronic four-wheel drive vehicle as an example.
Figure 2:
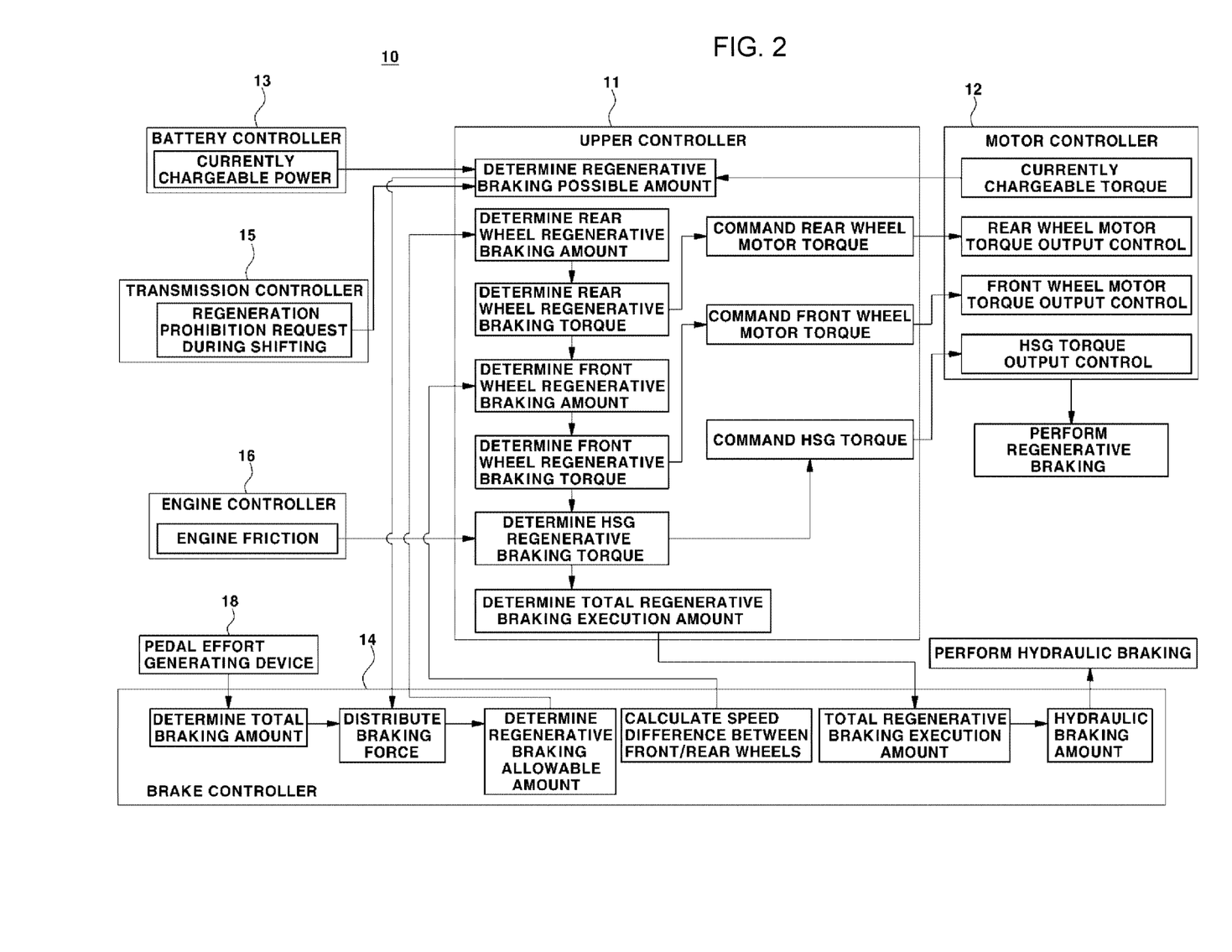
FIG. 2 is a diagram illustrating a configuration for a regenerative braking control of the electronic four-wheel drive vehicle according to various exemplary embodiments of the present invention.

FIG. 1 is a diagram illustrating a power transfer system of an electronic four-wheel drive (E-4WD) vehicle in which a front wheel power train including a front wheel motor and a rear wheel power train including a rear wheel motor are combined, that is, an electronic four-wheel drive vehicle, and FIG. 2 is a diagram illustrating a configuration for a regenerative braking control of the electronic four-wheel drive vehicle according to various exemplary embodiments of the present invention.

As illustrated in FIG. 1, a front wheel power train 100 may be configured to include an engine 110, a front wheel motor 120, a transmission 130, an engine clutch 140, and a hybrid starter generator (HSG) 170.

The engine 110 and the front wheel motor 120 may be connected in series with each other and may output power for vehicle traveling.

The transmission 130 is connected to the rear end portion (output end) of the front wheel motor 120 to shift the power of the engine 110 and the front wheel motor 120 to output the shifted power to a front wheel 150. The transmission 130 may shift the power generated by the engine 110 and the front wheel motor 120 according to a shift gear stage to transfer the shifted power to the front wheel 150. For example, the transmission 130 may employ an automatic transmission (AT) or a double clutch transmission (DCT).

The engine clutch 140 may be mounted between the engine 110 and the front wheel motor 120 to be engaged or disengaged. The engine clutch 140 may connect the engine 110 with the front wheel 150 to enable power transfer or release the connection between the engine 110 and the front wheel 150. When the engine clutch 140 is engaged, the engine power is transferred to the front wheel 150 through the transmission 130, and when the engine clutch 140 is disengaged, the engine power is disconnected and not transferred to the transmission 130.

The hybrid starter generator 170 is a motor which is connected to the engine 110 to start the engine 110 or to perform power generation using the surplus power of the engine 110. The hybrid starter generator 170 is configured as a start motor which starts the engine 110 or serve as a generator which selectively recovers rotational energy of the engine 110 after the engine 110 is started.

The front wheel motor 120 and the hybrid starter generator 170 are electrically connected to a battery 160. That is, the battery 160 is connected to the front wheel motor 120 and the hybrid starter generator 170 to be chargeable and dischargeable. The battery 160 may be discharged to the front wheel motor 120 and the hybrid starter generator 170 or charged by the front wheel motor 120 and the hybrid starter generator 170.

Furthermore, a rear wheel power train 200 may be configured to include a rear wheel motor 210 connected to the battery 160 to be chargeable and dischargeable, and a reducer 220 which reduces the power of the rear wheel motor 210 to output the reduced power to the rear wheel 230. The rear wheel motor 210 may be driven to output power for the vehicle traveling.

The present invention may improve fuel efficiency through the regenerative braking control optimized for the electronic four-wheel drive vehicle employing the power train configured as described above.

As a control unit 10 which is a control subject of the front wheel motor 120, the rear wheel motor 210, the hybrid starter generator 170, and the like upon the regenerative braking of the electronic four-wheel drive vehicle, as illustrated in FIG. 2, a higher level controller 11, a motor controller 12, a battery controller 13, a brake controller 14, a transmission controller 15, an engine controller 16, and the like may be employed.

Here, the motor controller 12, the battery controller 13, the brake controller 14, the transmission controller 15, and the engine controller 16 may be referred to as lower controllers.

The lower controllers 12, 13, 14, 15, 16 may provide various information to the higher level controller 11 or receive commands from the higher level controller 11 to perform a control corresponding to the corresponding command. Furthermore, the higher level controller 11 may instruct any one of the lower controllers 12, 13, 14, 15, 16 based on the information received from one or more of the lower controllers 12, 13, 14, 15, 16.

The motor controller 12 may receive the command from the higher level controller 11 to control the overall operation of the motors 120, 210 and the hybrid starter generator 170. For example, the motor controller 12 may control power generation operations of the motors 120, 210 and the hybrid starter generator 170 according to the command from the higher level controller 11.

The battery controller 13 may receive the command from the higher level controller 11 to control charging and discharging of the battery 160. Furthermore, the battery controller 13 may transmit currently chargeable battery power information to the higher level controller 11.

The brake controller 14 may receive the command from the higher level controller 11 to distribute a braking force or control a hydraulic braking of a brake system. For example, the brake controller 14 may instruct the hydraulic braking of the brake system securing the braking force through hydraulic pressure and control the hydraulic braking amount. The brake system may employ an active hydraulic booster (AHB), which is a type of electronic hydraulic booster, or the like.

Furthermore, the brake controller 14 may distribute the driver required braking amount to the hydraulic braking amount and the regenerative braking amount. The hydraulic braking amount is a braking amount to be secured through hydraulic braking upon braking, and the regenerative braking amount is a braking amount to be secured through the regenerative braking upon braking. At the instant time, the hydraulic braking amount may be referred to as a hydraulic braking request amount, and the regenerative braking amount may also be referred to as a regenerative braking allowable amount.

The engine controller 16 may transmit information such as an engine friction amount to the higher level controller 11.

The control unit 10 of the electronic four-wheel drive vehicle may perform the regenerative braking control optimized for the electronic four-wheel drive vehicle through a cooperative control of the higher level controller 11 and the lower controllers 12, 13, 14, 15, 16.

The control unit 10 may perform the regenerative braking control using not only the front wheel motor 120 but also the rear wheel motor 210 and the hybrid starter generator 170 to perform the regenerative braking control differentiated from the conventional regenerative braking control. That is, the control unit 10 may perform the regenerative braking control optimized by combining the rear wheel regenerative braking, the front wheel regenerative braking, and the HSG regenerative braking when the driver requests braking.

As is known, the regenerative braking refers to charging the battery by operating the motor as a generator using the surplus driving force of a vehicle wheel upon braking. The regenerative braking may regenerate the battery in a method for charging the surplus energy of the vehicle wheel unnecessary for traveling in the battery upon braking, improving fuel efficiency.

Here, the regenerative braking of the rear wheel is to charge the surplus driving force of the rear wheel 230 in the battery 160 through the rear wheel motor 210 upon braking, and the front wheel regenerative braking is to charge the surplus driving force of the front wheel 150 in the battery 160 through the front wheel motor 120 upon braking. Furthermore, the HSG regenerative braking is to charge the surplus driving force of the front wheel 150 in the battery 160 through the hybrid starter generator 170 upon braking.

The rear wheel power train 200 does not use the transmission and thus has power transfer efficiency higher than that of the front wheel power train 100. Accordingly, the rear wheel regenerative braking has power transmission efficiency higher than that of the front wheel regenerative braking, and it is preferable to preferentially perform the rear wheel regenerative braking prior to the front wheel regenerative braking.

Here, a regenerative braking control method of the electronic four-wheel drive vehicle according to various exemplary embodiments of the present invention will be described further with reference to FIG. 3, FIG. 4, FIG. 5 and FIG. 6.

Figure 3:
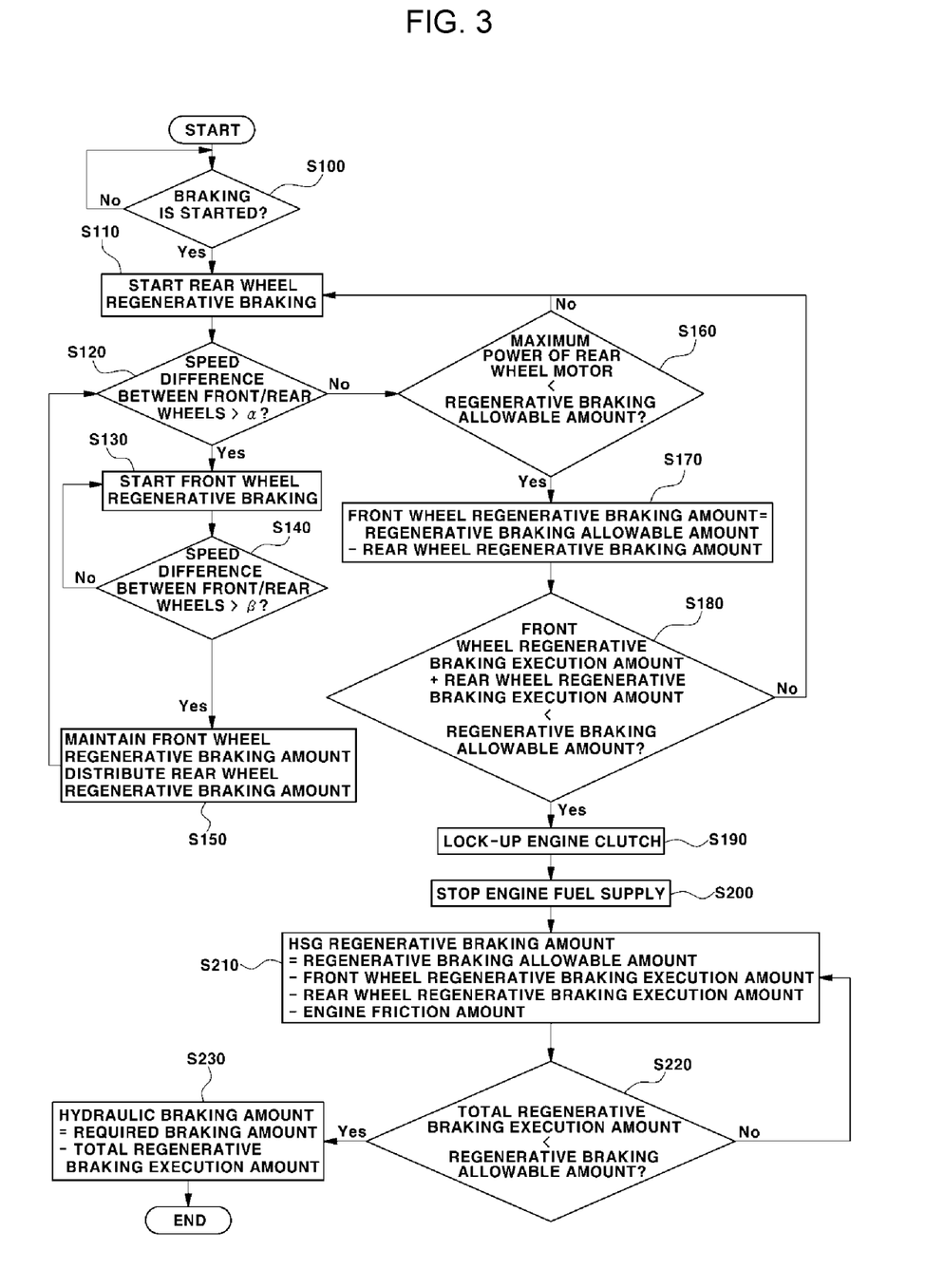
FIG. 3 is a flowchart illustrating a regenerative braking control process of the electronic four-wheel drive vehicle according to various exemplary embodiments of the present invention.
Figure 4:
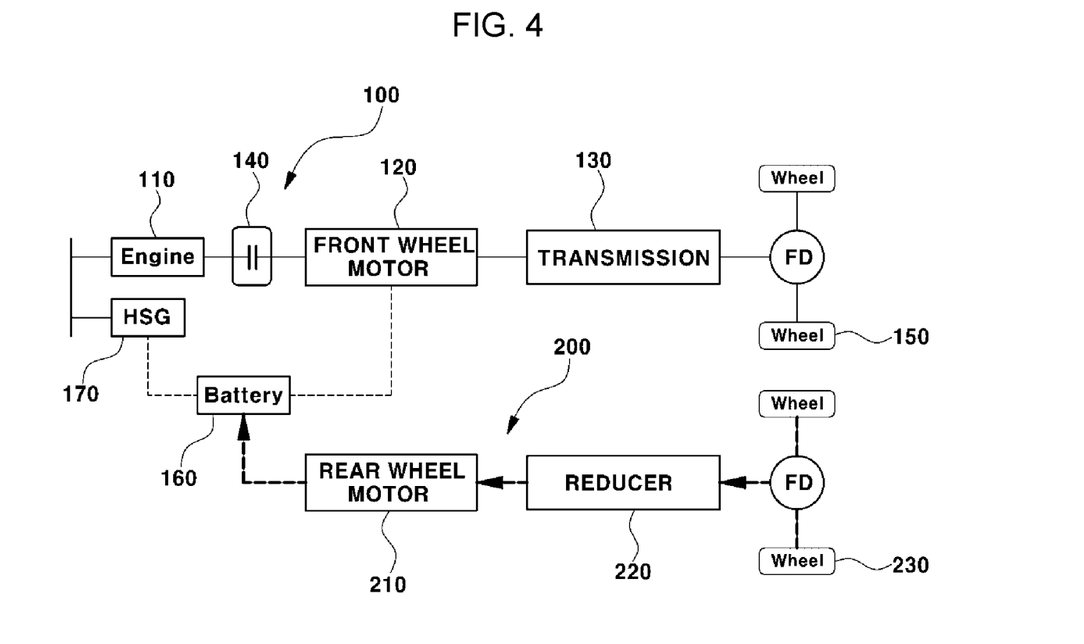
FIG. 4 is a diagram illustrating an energy transfer path upon rear wheel regenerative braking of the electronic four-wheel drive vehicle according to various exemplary embodiments of the present invention.
Figure 5:
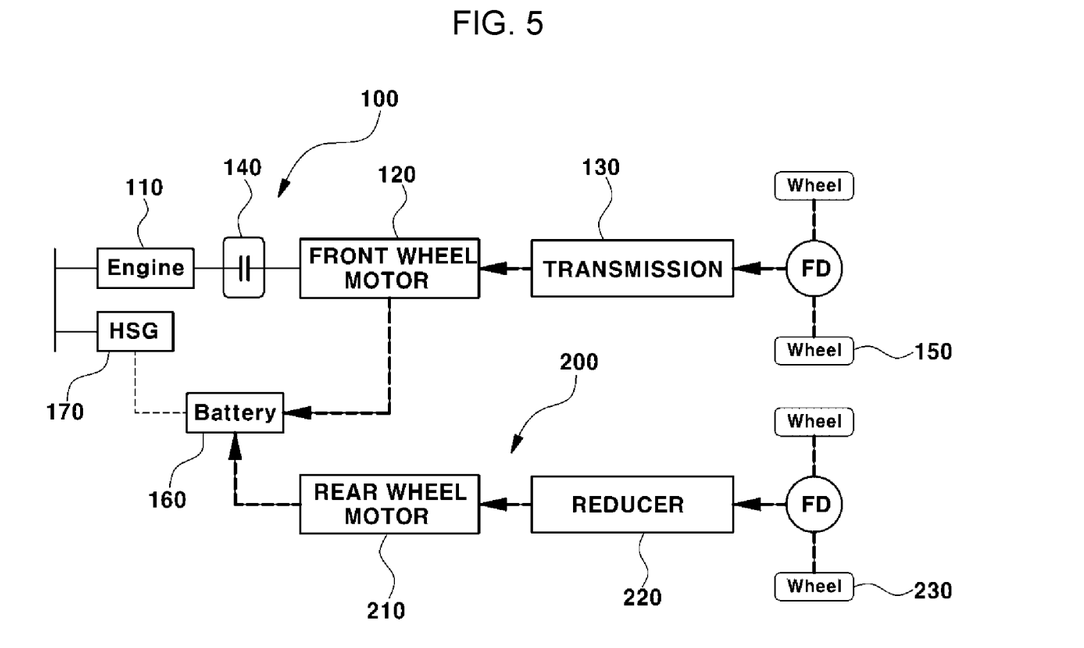
FIG. 5 is a diagram illustrating an energy transfer path upon front and rear wheel regenerative braking of the electronic four-wheel drive vehicle according to various exemplary embodiments of the present invention.
Figure 6:
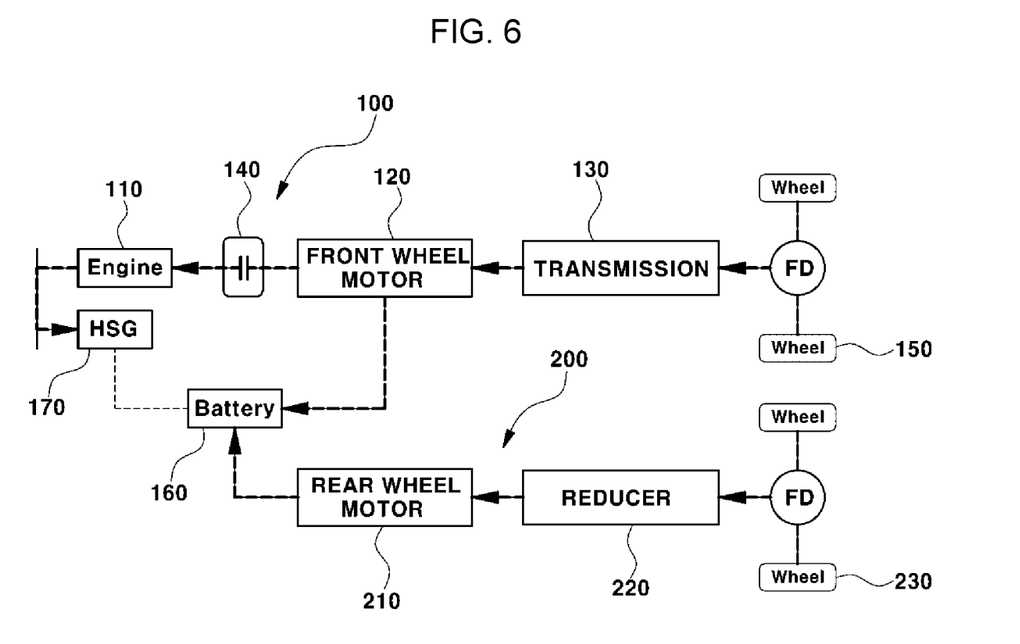
FIG. 6 is a diagram illustrating an energy transfer path upon regenerative braking cooperative control of the electronic four-wheel drive vehicle according to various exemplary embodiments of the present invention.

FIG. 3 is a flowchart illustrating a regenerative braking control process of the electronic four-wheel drive vehicle according to various exemplary embodiments of the present invention as an example, FIG. 4 is a diagram illustrating an energy transfer path upon rear wheel regenerative braking of the electronic four-wheel drive vehicle according to various exemplary embodiments of the present invention, FIG. 5 is a diagram illustrating an energy transfer path upon front and rear wheel regenerative braking of the electronic four-wheel drive vehicle according to various exemplary embodiments of the present invention, and FIG. 6 is a diagram illustrating an energy transfer path upon HSG regenerative braking of the electronic four-wheel drive vehicle according to various exemplary embodiments of the present invention.

As illustrated in FIG. 3, the regenerative braking control process first determines whether braking is started while the vehicle travels (S100), and starts the rear wheel regenerative braking control while the braking is started (S110).

The control unit 10 may determine whether a braking pedal is operated to determine whether the braking is started. Furthermore, the control unit 10 may determine a total braking amount (that is, driver required braking amount) which is changed according to the stroke of the braking pedal.

If the driver depresses the braking pedal, a signal from a pedal effort generating device 18 operated according to the stroke of the braking pedal may be input to the brake controller 14. The brake controller 14 may determine the total braking amount which is changed according to the stroke of the braking pedal based on the signal from the pedal effort generating device 18.

For example, the pedal effort generating device may be a pedal simulator which generates pedal effort according to the stroke of the braking pedal.

When the braking pedal is operated, the control unit 10 may determine a torque configured for charging the battery 160 in real time (that is, currently chargeable torque) and power configured for being charged in the battery 160 in real time (that is, currently chargeable power) using the motors 120, 210 and the hybrid starter generator 170. The control unit 10 may determine the regenerative braking possible amount based on the currently chargeable torque and the currently chargeable power.

The motor controller 12 may determine the currently chargeable torque based on information such as the real-time driving force of the vehicle wheel and the stroke of the braking pedal, and the battery controller 13 may determine the currently chargeable power based on information such as a state of charge (SOC) value of the battery 160. The higher level controller 11 may determine the regenerative braking possible amount based on the currently chargeable torque information received from the motor controller 12 and the currently chargeable power information received from the battery controller 13.

At the present time, the transmission controller 15 may request to stop the regenerative braking during shifting according to a traveling mode of the vehicle. For example, the transmission controller 15 may request the higher level controller 11 to limit the regenerative braking upon shifting to an uphill mode, a sports mode, and the like. When receiving the request for limiting the regenerative braking from the transmission controller 15, the higher level controller 11 does not determine the regenerative braking possible amount or may determine it as '0'.

When determining the currently chargeable torque, the motor controller 12 may send the maximum torque information related to the front wheel motor 120, the rear wheel motor 210, and the hybrid starter generator 170 to the higher level controller 11.

Furthermore, when the higher level controller 11 transmits the regenerative braking possible amount information to the brake controller 14, the brake controller 14 may distribute the driver required braking amount to the regenerative braking allowable amount and the hydraulic braking request amount. That is, the brake controller 14 may determine the regenerative braking allowable amount based on the driver required braking amount and the regenerative braking possible amount.

The regenerative braking possible amount means the energy which may be recovered from the vehicle wheel using the front wheel motor 120, the rear wheel motor 210, and the hybrid starter generator 170 upon braking, and the regenerative braking allowable amount means the energy to be recovered through the regenerative braking of the driver required braking amount.

The higher level controller 11 first determines the rear wheel regenerative braking required amount based on the regenerative braking allowable amount information received from the brake controller 14. The rear wheel regenerative braking required amount may be determined as the regenerative braking allowable amount or less and determined as the maximum braking amount which may be distributed to the rear wheel motor 210 (that is, the maximum power of the rear wheel motor).

When the rear wheel regenerative braking control is started in the S110, as described above, the higher level controller 11 determines the rear wheel regenerative braking required amount, determines the rear wheel regenerative braking torque based on the rear wheel regenerative braking required amount, and instructs the torque output of the rear wheel motor 210 based on the rear wheel regenerative braking torque. The rear wheel regenerative braking torque may be determined by converting the rear wheel regenerative braking required amount into a torque value.

The higher level controller 11 transmits the rear wheel regenerative braking torque information to the motor controller 12, and the motor controller 12 controls the output of the rear wheel motor 210 according to the command from the higher level controller 11. At the instant time, the rear wheel motor 210 outputs the rear wheel regenerative braking torque, and the battery 160 is charged with power corresponding to the output of the rear wheel motor 210. Accordingly, as illustrated in FIG. 4, the surplus driving force of the rear wheel 230 may be charged in the battery 160 through the rear wheel motor 210.

Since the rear wheel motor 210 is not connected to the transmission 130 and connected to the reducer 220, the rear wheel motor 210 has less loss upon power transfer compared to the front wheel motor 120, and thus, if the regenerative braking is performed using the rear wheel motor 210, it is very advantageous in terms of power transfer efficiency. Accordingly, that the regenerative braking using the rear wheel motor 210 is performed prior to the regenerative braking using the front wheel motor 120 is also advantageous to improve fuel efficiency.

However, there is a concern on wheel slip if only the rear wheel regenerative braking is first started upon braking. Accordingly, when the rear wheel regenerative braking is started, it is necessary to determine whether the slip of the rear wheel 230 occurs according to a speed difference between the front wheel 150 and the rear wheel 230 (hereinafter, interchangeably used with 'a wheel speed difference') to secure braking stability. When the slip occurs in the rear wheel 230, it results in vehicle accidents, so that it is preferable to determine whether the slip occurs using the wheel speed difference.

To determine whether the slip occurs, the wheel speed difference may be compared with a predetermined first reference value ($\alpha$) (S120), and when the wheel speed difference is the first reference value ($\alpha$) or more, it may be determined that the slip of the rear wheel 230 occurs or it may be predicted that the slip of the rear wheel 230 will occur.

The brake controller 14 may determine the difference between the front wheel speed and the rear wheel speed to transmit the determined result to the higher level controller 11, and the higher level controller 11 may predict and determine whether the slip of the rear wheel 230 occurs based on the wheel speed difference information received from the brake controller 14.

Here, the first reference value ($\alpha$) may be determined as a value derived through pre-experiments, evaluations, or the like, and set to a value by which the occurrence of wheel slip is predicted or determined. The first reference value ($\alpha$) may be set to a value smaller than a slip determination reference value typically applied if only the front wheel regenerative braking is performed, and for example, the first reference value ($\alpha$) may be determined as a value smaller than 2.5 kph.

Furthermore, the first reference value ($\alpha$) is preferably determined as a value configured for determining whether the wheel slip occurs before a system operation such as an electronic stability control system (ESC) for vehicle posture control is required due to the wheel slip.

When it is determined in the S120 that the speed difference between the front wheel 150 and the rear wheel 230 is the first reference value ($\alpha$) or more, the front wheel regenerative braking control is started to reduce the wheel slip (S130). That is, when the rear wheel regenerative braking is started and the speed difference between the front wheel 150 and the rear wheel 230 is the first reference value ($\alpha$) or more, the front wheel regenerative braking required amount is distributed to the front wheel motor 120 so that the front wheel regenerative braking is started.

At the present time, the front wheel regenerative braking required amount may be determined based on the speed difference between the front wheel 150 and the rear wheel 230 to release the slip of the rear wheel 230.

The higher level controller 11 may determine the front wheel regenerative braking required amount based on the wheel speed difference information transmitted from the brake controller 14. The higher level controller 11 may determine the front wheel regenerative braking torque based on the front wheel regenerative braking required amount, and instruct the torque output of the front wheel motor 120 based on the front wheel regenerative braking torque.

The higher level controller 11 may transmit the front wheel regenerative braking torque information to the motor controller 12, and the motor controller 12 may control the output of the front wheel motor 120 according to the command of the higher level controller 11. At the instant time, the front wheel motor 120 may output the front wheel regenerative braking torque, and the battery 160 may be charged with power corresponding to the output of the front wheel motor 120. Accordingly, as illustrated in FIG. 5, the surplus driving force of the front wheel 150 may be charged in the battery 160 through the front wheel motor 120.

When the front wheel regenerative braking and the rear wheel regenerative braking are distributed, there exists a concern on the slip if the speed difference between the front wheel 150 and the rear wheel 230 occurs. Accordingly, by determining the front wheel regenerative braking required amount based on the speed difference between the front wheel 150 and the rear wheel 230, it is possible to secure braking stability and to improve fuel efficiency.

Furthermore, when the front wheel regenerative braking is started, it is preferable to reduce the regenerative braking torque of the rear wheel motor 210 by the regenerative braking torque distributed to the front wheel motor 120. That is, it is preferable to subtract the rear wheel regenerative braking required amount by the front wheel regenerative braking required amount determined when the front wheel regenerative braking is started. The above is for the sum of the front wheel regenerative braking required amount and the rear wheel regenerative braking required amount not to exceed the regenerative braking allowable amount because the front wheel regenerative braking is performed for braking stability regardless of the regenerative braking allowable amount if it is determined that the slip occurs based on the wheel speed difference.

That is, by reducing the rear wheel regenerative braking required amount by the increased front wheel regenerative braking required amount as the front wheel regenerative braking is started, it is possible to prevent the sum of the front wheel regenerative braking required amount and the rear wheel regenerative braking required amount from exceeding the regenerative braking allowable amount.

After the front wheel regenerative braking is started in the S130, to determine whether the slip of the rear wheel 230 is reduced and the braking is stabilized, the speed difference between the front wheel 150 and the rear wheel 230 is compared with a predetermined second reference value ($\beta$) (S140).

When the speed difference between the front wheel 150 and the rear wheel 230 (that is, wheel speed difference) is greater than the second reference value ($\beta$), it may be determined that the slip of the rear wheel 230 has not been released yet, and when the wheel speed difference is the second reference value ($\beta$) or less, it may be determined that the slip of the rear wheel 230 is released.

Accordingly, when the wheel speed difference is greater than the second reference value ($\beta$), the front wheel regenerative braking required amount and the rear wheel regenerative braking required amount are maintained as it is, and when the wheel speed difference is reduced and becomes the second reference value ($\beta$) or less, the front wheel regenerative braking required amount is maintained as it is and the rear wheel regenerative braking required amount is determined and distributed based on the regenerative braking allowable amount and the front wheel regenerative braking required amount (S150).

For example, if the sum of the front wheel regenerative braking required amount and the rear wheel regenerative braking required amount is smaller than the regenerative braking allowable amount at the time point when the wheel speed difference becomes the second reference value ($\beta$), the front wheel regenerative braking required amount may be maintained and the rear wheel regenerative braking required amount may be increased so that the sum of the front wheel regenerative braking required amount and the rear wheel regenerative braking required amount becomes the regenerative braking allowable amount. That is, when the wheel speed difference becomes the second reference value ($\beta$) or less, a value obtained by subtracting the front wheel regenerative braking required amount from the regenerative braking allowable amount may be determined as the rear wheel regenerative braking required amount.

Furthermore, if the regenerative braking allowable amount is reduced, the front wheel regenerative braking required amount and the rear wheel regenerative braking required amount are simultaneously reduced while a ratio of the front wheel regenerative braking required amount and the rear wheel regenerative braking required amount is maintained as it is. The ratio of the front wheel regenerative braking required amount and the rear wheel regenerative braking required amount is the ratio at the time point when the wheel speed difference becomes the second reference value ($\beta$).

Here, the second reference value ($\beta$) may be determined as a value derived through pre-experiments, evaluations, or the like, and the second reference value ($\beta$) is determined as a value smaller than the first reference value ($\alpha$). Furthermore, to prevent the slip of the rear wheel 230 from occurring again during the current regenerative braking, the second reference value ($\beta$) is preferably set to a value smaller than the first reference value ($\alpha$) by a predetermined value or more. Furthermore, the second reference value ($\beta$) is preferably set to a value greater than a speed measurement error of the front wheel 150 and the rear wheel 230, and the speed measurement error is about 0.5 kph. For example, when the second reference value ($\beta$) is set mainly for fuel efficiency, the speed measurement error may be set to 1 kph to 1.5 kph.

Meanwhile, as a result of comparing the speed difference between the front wheel 150 and the rear wheel 230 with the first reference value ($\alpha$) in the S120, when the speed difference between the front wheel 150 and the rear wheel 230 is smaller than the first reference value ($\alpha$), that is, when it is determined that the slip of the rear wheel 230 does not occur, the maximum power of the rear wheel motor is compared with the regenerative braking allowable amount (S160). At the instant time, the regenerative braking allowable amount may be converted into a power value and then compared with the maximum power of the rear wheel motor. The maximum power of the rear wheel motor is the maximum power which may be output from the rear wheel motor 210 for charging the battery 160.

As the comparison result in the S160, when the maximum power of the rear wheel motor is the regenerative braking allowable amount or more, the regenerative braking allowable amount may be satisfied with only the rear wheel regenerative braking, so that only the rear wheel regenerative braking may be continuously performed in S110 (No in S160).

Furthermore, as the comparison result in the S160, if the maximum power of the rear wheel motor is smaller than the regenerative braking allowable amount, the regenerative braking allowable amount may not be satisfied with only the rear wheel regenerative braking, so that the front wheel regenerative braking is started. At the instant time, a value obtained by subtracting the rear wheel regenerative braking required amount from the regenerative braking allowable amount (the regenerative braking allowable amount—the rear wheel regenerative braking required amount) is determined as the front wheel regenerative braking required amount (S170).

After the front wheel regenerative braking is started, a value obtained by summing a front wheel regenerative braking execution amount and a rear wheel regenerative braking execution amount (the front wheel regenerative braking execution amount+the rear wheel regenerative braking execution amount) is compared with the regenerative braking allowable amount (S180).

When the sum of the front wheel regenerative braking execution amount and the rear wheel regenerative braking execution amount is greater than the regenerative braking allowable amount (No in S180), it returns to step S110 and the rear wheel regenerative braking required amount and the front wheel regenerative braking required amount are redistributed. When the sum of the front wheel regenerative braking execution amount and the rear wheel regenerative braking execution amount is the regenerative braking allowable amount or less, that is, when the regenerative braking allowable amount is greater than the sum of the front wheel regenerative braking execution amount and the rear wheel regenerative braking execution amount (Yes in S180), it proceeds to S190 and it is determined whether the lock-up of the engine clutch 140 is possible to start the HSG regenerative braking.

For the engine clutch 140 to perform the lock-up operation, the speed of the front wheel motor 120 is required to be greater than a controllable lowest speed (hereinafter, referred to as the lowest control speed) of the engine 110.

When the lock-up condition of the engine clutch 140 is satisfied, that is, when the speed of the front wheel motor 120 is greater than the lowest control speed of the engine 110, the engine clutch 140 is locked up to connect the hybrid starter generator 170 with the front wheel 150 to be power-transferable (S190). When the engine clutch 140 is locked up, the engine fuel supply is stopped (S200) to stop the driving of the engine 110.

That is, when the regenerative braking allowable amount is greater than the sum of the front wheel regenerative braking execution amount and the rear wheel regenerative braking execution amount and the engine clutch 140 is locked up, the fuel supply to the engine 110 is stopped and HSG regenerative braking control is started.

Since the engine 110 is mounted between the front wheel 150 and the hybrid starter generator 170 and the engine 110 operates as load when the HSG regenerative braking is performed, the HSG regenerative braking required amount is determined in consideration of an engine friction amount. A value obtained by subtracting the front wheel regenerative braking execution amount, the rear wheel regenerative braking execution amount, and the engine friction amount from the regenerative braking allowable amount as expressed in Equation 1 below may be determined as the HSG regenerative braking required amount (S210).

the HSG regenerative braking required amount=the regenerative braking allowable amount−the front wheel regenerative braking execution amount−the rear wheel regenerative braking execution amount−the engine friction amount   Equation 1:

Here, a value obtained by multiplying engine friction (that is, engine friction torque) by the engine speed (the engine friction×the engine speed) may be determined as the engine friction amount. The engine speed is the speed applied to the engine 110 when the hybrid starter generator outputs the HSG regenerative braking torque.

The higher level controller 11 may determine the HSG output torque (that is, HSG regenerative braking torque) for charging the battery 160 based on the HSG regenerative braking required amount determined as described above.

The higher level controller 11 may determine the HSG regenerative braking torque by converting the HSG regenerative braking required amount into a torque value, and instruct the motor controller 12 to perform a power generation operation of the hybrid starter generator 170. At the instant time, the motor controller 12 may command the output of the torque (HSG regenerative braking torque) to the hybrid starter generator 170 according to the command from the higher level controller 11.

If the hybrid starter generator 170 performs the power generation operation, that is, if the hybrid starter generator 170 outputs HSG regenerative braking torque, as illustrated in FIG. 6, the surplus driving force of the front wheel 150 may be charged in the battery 160 through the hybrid starter generator 170.

After the HSG regenerative braking required amount is determined in the S210, the total regenerative braking execution amount is compared with the regenerative braking allowable amount (S220).

The total regenerative braking execution amount means the braking energy which substantially operates on the vehicle wheel when the regenerative braking is performed using the front wheel motor 120, the rear wheel motor 210, and the hybrid starter generator 170, and may be different from the regenerative braking allowable amount. A value obtained by summing the front wheel regenerative braking execution amount, the rear wheel regenerative braking execution amount, the HSG regenerative braking execution amount and the engine friction amount is determined as the total regenerative braking execution amount.

The front wheel regenerative braking execution amount means the braking energy which is actually transferred to and operates on the front wheel 150 when the front wheel motor 120 outputs the front wheel regenerative braking torque, the rear wheel regenerative braking execution amount means the braking energy which is actually transferred to and operates on the rear wheel 230 when the rear wheel motor 210 outputs the rear wheel regenerative braking torque, and the HSG regenerative braking execution amount means the braking energy which is actually transferred to and operates on the front wheel 150 when the hybrid start generator 170 outputs the HSG regenerative braking torque.

Accordingly, the front wheel regenerative braking execution amount may be different from the front wheel regenerative braking required amount, the rear wheel regenerative braking execution amount may be different from the rear wheel regenerative braking required amount, and the HSG regenerative braking execution amount may be different from the HSG regenerative braking required amount.

For example, the higher level controller 11 may determine the front wheel regenerative braking execution amount based on the front wheel regenerative braking torque, determine the rear wheel regenerative braking execution amount based on the rear wheel regenerative braking torque, and determine the HSG regenerative braking execution amount based on the HSG regenerative braking torque, as determined in advance.

The higher level controller 11 may determine the total regenerative braking execution amount to transmit the determined result to the brake controller 14, and the brake controller 14 may determine the hydraulic braking amount again based on the total regenerative braking execution amount information received from the higher level controller 11.

As a result of comparing the total regenerative braking execution amount with the regenerative braking allowable amount in the S220, when the total regenerative braking execution amount is smaller than the regenerative braking allowable amount (Yes in S220), it proceeds to S230 and the hydraulic braking amount is determined again and distributed. At the instant time, a value obtained by subtracting the total regenerative braking execution amount from the driver required braking amount (the driver required braking amount—the total regenerative braking execution amount) may be determined as the hydraulic braking amount (S230). When the total regenerative braking execution amount is not smaller than the regenerative braking allowable amount (No in S220), it returns to S210.

The brake controller 14 may control the hydraulic braking of the brake system based on the determined hydraulic braking amount.

As described above, the present invention may preferentially perform the rear wheel regenerative braking when the braking of the vehicle is started, and perform the front wheel regenerative braking to release the slip if there is a concern on the slip occurrence as the rear wheel regenerative braking is preferentially performed, securing braking stability and at the same time, improving fuel efficiency.

Furthermore, the present invention may further perform the HSG regenerative braking in addition to the front wheel regenerative braking if the regenerative braking allowable amount is not satisfied when the rear wheel regenerative braking is first performed, maximally securing an effect of improving fuel efficiency by the regenerative braking.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A regenerative braking control device for a vehicle, the regenerative braking control device comprising:
a front wheel power train including first elements of an engine, a front wheel motor, an engine clutch mounted between the engine and the front wheel motor, a hybrid starter generator (HSG) connected to the engine to start the engine, and a transmission for shifting power of the engine and the front wheel motor to output the shifted power to a front wheel of the vehicle;
a rear wheel power train including second elements of a rear wheel motor, and a reducer for reducing power of the rear wheel motor to output the reduced power to a rear wheel of the vehicle;
a battery connected to the front wheel motor, the rear wheel motor, and the hybrid starter generator to be chargeable and dischargeable; and
a control unit connected to the front wheel power train and the rear wheel power train, wherein the control unit is configured for distributing a rear wheel regenerative braking required amount to the rear wheel motor while braking is started, by controlling at least one of the first elements of the front wheel power train and the second elements of the rear wheel power train, and configured for distributing a front wheel regenerative braking required amount to the front wheel motor by controlling at least one of the first elements of the front wheel power train and the second elements of the rear wheel power train upon determining that a slip of the rear wheel will occur according to a speed difference between the front wheel and the rear wheel.

2. The regenerative braking control device of claim 1, wherein the control unit is configured to distribute the front wheel regenerative braking required amount to the front wheel motor when a maximum power of the rear wheel motor is lower than a regenerative braking allowable amount determined according to a driver required braking amount, upon determining that the slip of the rear wheel won't occur according to the speed difference between the front wheel and the rear wheel.

3. The regenerative braking control device of claim 2, wherein the control unit is configured to determine that the slip of the rear wheel won't occur upon determining that the speed difference between the front wheel and the rear wheel is lower than a predetermined first reference value, and is configured to determine that the slip of the rear wheel will occur upon determining that the speed difference between the front wheel and the rear wheel is equal to or greater than the predetermined first reference value, and thus performs a front wheel regenerative braking control.

4. The regenerative braking control device of claim 3, wherein the control unit is configured to maintain the front wheel regenerative braking required amount and is configured to determine the rear wheel regenerative braking required amount as a value obtained by subtracting the front wheel regenerative braking required amount from the regenerative braking allowable amount, when distributing the front wheel regenerative braking required amount to the front wheel motor and then determining that the slip of the rear wheel is released according to the speed difference between the front wheel and the rear wheel.

5. The regenerative braking control device of claim 4, wherein the control unit is configured to determine that the slip of the rear wheel is released upon determining that the speed difference between the front wheel and the rear wheel is equal to or lower than a second reference value, the second reference value being lower than the first reference value.

6. The regenerative braking control device of claim 2, wherein the control unit is configured to determine the front wheel regenerative braking required amount as a value obtained by subtracting the rear wheel regenerative braking required amount from the regenerative braking allowable amount, upon determining that the slip of the rear wheel won't occur.

7. The regenerative braking control device of claim 6, wherein the control unit is configured to distribute a Hybrid Starter Generator (HSG) regenerative braking required amount to the hybrid starter generator upon determining that the regenerative braking allowable amount is greater than a sum of a rear wheel regenerative braking execution amount and a front wheel regenerative braking execution amount, upon determining that the slip of the rear wheel won't occur.

8. The regenerative braking control device of claim 7, wherein a value obtained by subtracting the front wheel regenerative braking execution amount, the rear wheel regenerative braking execution amount, and an engine friction amount from the regenerative braking allowable amount is determined as the HSG regenerative braking required amount.

9. The regenerative braking control device of claim 7, wherein the control unit is configured to perform a Hybrid Starter Generator (HSG) regenerative braking control using the hybrid starter generator in a state of locking-up the engine clutch and stopping an engine fuel supply.

10. The regenerative braking control device of claim 1, wherein the control unit is configured to determine the front wheel regenerative braking required amount according to the speed difference between the front wheel and the rear wheel upon determining that the slip of the rear wheel will occur.

11. The regenerative braking control device of claim 1, wherein the control unit is configured to reduce the rear wheel regenerative braking required amount distributed to the rear wheel motor by the front wheel regenerative braking required amount distributed to the front wheel motor, upon determining that the slip of the rear wheel will occur.

12. A method of controlling a regenerative braking control device for a vehicle, the method comprising:
   distributing, by a controller, a rear wheel regenerative braking required amount to a rear wheel motor while braking is started; and
   distributing a front wheel regenerative braking required amount to a front wheel motor upon determining that a slip of a rear wheel of the vehicle will occur according to a speed difference between a front wheel and the rear wheel of the vehicle,
   wherein the regenerative braking control device comprises:
      a front wheel power train including first elements of an engine, the front wheel motor, an engine clutch mounted between the engine and the front wheel motor, a hybrid starter generator (HSG) connected to the engine to start the engine, and a transmission of shifting power of the engine and the front wheel motor to output the shifted power to the front wheel of the vehicle;
      a rear wheel power train including second elements of the rear wheel motor, and a reducer for reducing power of the rear wheel motor to output the reduced power to the rear wheel of the vehicle; and
      a control unit configured for controlling at least one of the first elements of the front wheel power train and the second elements of the rear wheel power train.

13. The method of claim 12,
   wherein the control unit is configured to distribute the front wheel regenerative braking required amount to the front wheel motor when a maximum power of the rear wheel motor is lower than a regenerative braking allowable amount determined according to a driver required braking amount, upon determining that the slip of the rear wheel won't occur according to the speed difference between the front wheel and the rear wheel.

14. The method of claim 13, wherein when the maximum power of the rear wheel motor is lower than the regenerative braking allowable amount, a value obtained by subtracting the rear wheel regenerative braking required amount from the regenerative braking allowable amount is determined as the front wheel regenerative braking required amount.

15. The method of claim 14, wherein when a sum of a front wheel regenerative braking execution amount and a rear wheel regenerative braking execution amount is equal to or lower than the regenerative braking allowable amount, and when a speed of the front wheel motor is greater than a lowest control speed of the engine, the engine clutch is locked up by the control unit to connect the hybrid starter generator with the front wheel.

16. The method of claim 15, wherein a value obtained by subtracting the front wheel regenerative braking execution amount, the rear wheel regenerative braking execution amount, and an engine friction amount from the regenerative braking allowable amount is determined as a HSG regenerative braking required amount.

17. The method of claim 13,
   maintaining the front wheel regenerative braking required amount and determining the rear wheel regenerative braking required amount as a value obtained by subtracting the front wheel regenerative braking required amount from the regenerative braking allowable amount, when distributing the front wheel regenerative braking required amount to the front wheel motor and then determining that the slip of the rear wheel is released according to the speed difference between the front wheel and the rear wheel.

18. The method of claim 17,
   wherein the control unit is configured to determine that the slip of the rear wheel is released upon determining that the speed difference between the front wheel and the rear wheel is equal to or lower than a reference value.

* * * * *